(12) United States Patent
Myers et al.

(10) Patent No.: US 6,289,988 B1
(45) Date of Patent: Sep. 18, 2001

(54) PROCESS FOR MANAGEMENT OF INDUSTRIAL WASTES

(75) Inventors: Ronald Damian Myers; John Brenton MacLeod; Norman A. Chambers; Mainak Ghosh, all of Calgary (CA)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 09/535,118

(22) Filed: Mar. 24, 2000

(51) Int. Cl.[7] .................................................... E21B 43/24
(52) U.S. Cl. ........................ 166/267; 95/235; 210/747; 166/303; 423/224
(58) Field of Search ............................. 166/75.12, 90.1, 166/266, 267, 272.3, 303; 95/235; 210/747; 423/224, 243.01

(56) References Cited

U.S. PATENT DOCUMENTS

| | | | |
|---|---|---|---|
| 3,844,349 | * 10/1974 | Snavely, Jr. et al. ............. | 166/272.3 |
| 3,880,237 | * 4/1975 | Snavely, Jr. et al. ............. | 166/266 X |
| 4,223,735 | * 9/1980 | Caldwell, Jr. et al. ............. | 166/401 |
| 4,344,486 | * 8/1982 | Parrish ............................. | 166/266 X |
| 4,382,912 | * 5/1983 | Madgavkar et al. ................. | 423/224 |
| 4,440,650 | * 4/1984 | Watson et al. ..................... | 166/266 X |
| 4,877,536 | * 10/1989 | Bertness et al. ................. | 210/747 X |
| 4,969,520 | * 11/1990 | Jan et al. ............................. | 166/266 |
| 5,656,172 | * 8/1997 | Kitz et al. ........................ | 210/747 X |

* cited by examiner

Primary Examiner—George Suchfield
(74) Attorney, Agent, or Firm—Joseph J. Allocca

(57) ABSTRACT

The present invention provides a process for the management of $H_2S$ containing gas streams and high alkalinity water streams in which process the $H_2S$ is selectively removed from the gas stream and combusted to form an $SO_2$ rich waste gas stream. The $SO_2$ gas stream is then scrubbed with the water stream to substantially remove the $SO_2$ from the gas while subsequent treatment of the water such as softening or settling is improved.

4 Claims, 1 Drawing Sheet

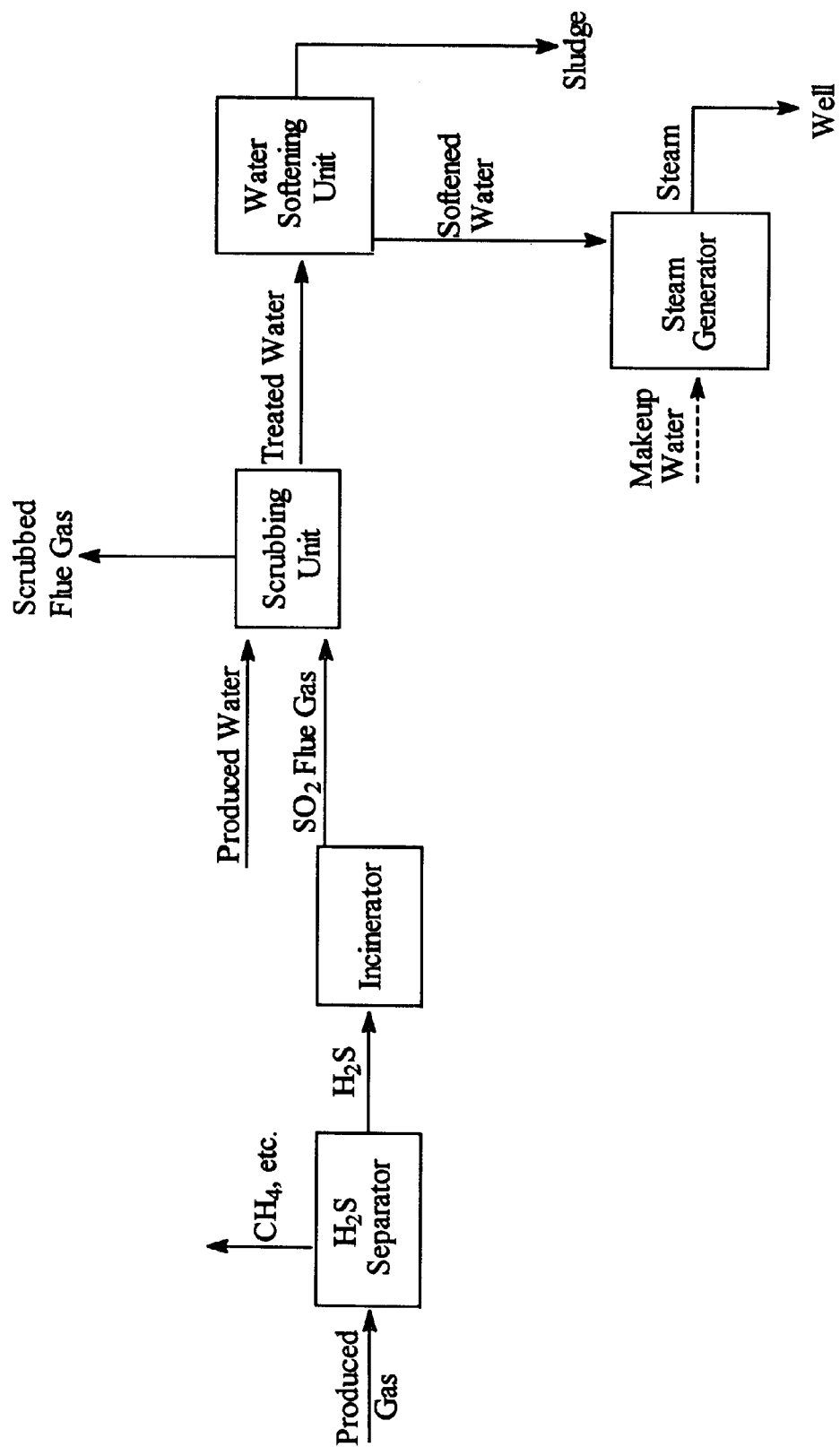

PROCESS FOR MANAGEMENT OF INDUSTRIAL WASTES

FIELD OF INVENTION

The present invention relates to the management of industrial waste streams. More particularly the invention is concerned with improvements in the desulfurization of effluent gases using high alkalinity water produced in industrial processes such as in bitumen recovery and tar sands mining and extraction.

BACKGROUND OF INVENTION

Sulfur containing effluent gas streams are a byproduct of many industrial processes. For example, produced gases associated with the steam-based recovery of bitumen from oil sands contain primarily methane, $CO_2$, minor amounts of $C_6$ or lower alkanes and $H_2S$ in amounts of about 0.5 mole % or so. Combustion of these $H_2S$ containing gas streams, of course, results in the formation of $SO_2$ which becomes a component of the flue gas. In order to meet environmental requirements it is necessary to remove the $SO_2$ from such effluent flue gas streams.

Typically the $SO_2$ present in effluent flue gas streams resulting from the combustion of fuels that contain $H_2S$ or other sulfur compounds is removed from the effluent stream by one of a variety of scrubbing techniques. For example, one technique involves scrubbing the gas with an aqueous solution of sodium hydroxide or ammonia This, of course, suffers from the disadvantage of having to purchase, store and mix the requisite reagent, as well as dispose of the resulting waste material.

Another technique for removing $SO_2$ from flue gas involves scrubbing the effluent with seawater. Seawater scrubbing, of course, is limited to use at facilities in the immediate vicinity of a seawater source. Additionally, the used seawater must be diluted and its pH buffered with fresh seawater before it can be disposed of and this incurs additional pumping expense.

Yet another scrubbing technique utilizes a limestone slurry or variations thereof Although limestone slurry processes and modifications thereof are the most widely used method of flue gas desulfurization, they result in the formation of a spent slurry that needs to be disposed of by land farming or other means.

In U.S. Pat. No. 3,844,349 there is disclosed a process for producing petroleum by steam injection into a petroleum-bearing formation in which the steam is generated by firing a steam generator with a sulfur containing fuel. The resultant flue gas is scrubbed with alkaline water obtained from the petroleum bearing formation. This technique requires pumping large volumes of flue gas for treatment and exposes the steam generators to potentially corrosive conditions.

In view of the foregoing, there remains a need for improvements in processing waste streams such as those generated in burning the gas obtained as a byproduct in bitumen production which is highly effective, practical and economically attractive.

SUMMARY OF INVENTION

Broadly stated, the present invention provides a process for the management of industrial waste streams comprising $H_2S$ containing gas streams and high alkalinity water streams in which process the $H_2S$ is selectively removed from the gas stream and combusted to form an $SO_2$ rich waste gas stream which is scrubbed with the high alkalinity water thereby substantially removing the $SO_2$ from the gas stream.

BRIEF DESCRIPTION OF THE DRAWING

The accompanying FIGURE is a block flow diagram of one embodiment of the present invention.

DETAILED DESCRIPTION OF INVENTION

The waste stream management system of the present invention is applicable to a wide range of operations in which $H_2S$ containing effluent gas streams are obtained and in which high alkalinity water streams are readily available. A specific example is the production of bitumen from tar sands where steam is injected into a well for the purpose of recovering the bitumen from the tar sands. A result of this operation is that an $H_2S$ containing effluent gas stream ("produced gas") is obtained as well as a high bicarbonate alkalinity water stream. The produced gas is largely methane with lesser amounts of $CO_2$, lower alkanes and $H_2S$. Typically the $H_2S$ in the produced gas stream is present in amounts ranging from about 0.05 to about 0.5 mole %, although higher concentrations of $H_2S$ may be encountered in some instances.

The recovered water stream ("produced water") typically has a pH in the range of about 7.5 to 8.0 and contains from about 500 to about 600 ppm bicarbonate.

In the embodiment shown in the FIGURE, the $H_2S$ present in the produced gas is first selectively removed from the produced gas effectively providing a concentrated $H_2S$ gas stream. In general, any technique known in the art may be used to concentrate the $H_2S$ such as contacting the produced gas with a regenerable amine or molecular sieve capable of selectively absorbing $H_2S$ and thereafter regenerating the absorbent to provide the concentrated $H_2S$ gas stream. Depending upon the separation process used, the $H_2S$ gas stream may contain some or all of the $CO_2$ that was present in the produced gas. In any event, the concentrated $H_2S$ gas stream is combusted with air and any necessary supplemental fuel to ensure complete combustion, in an incinerator to produce an $SO_2$ rich flue gas stream.

Produced water having a high alkalinity, e.g., a bicarbonate content of about 400 to about 600 ppm bicarbonate is used to scrub the $SO_2$ rich flue gas in a scrubber. A variety of scrubber designs may be used to contact the $SO_2$ rich flue gas with high alkalinity water. Preferably the flue gas is sparged through a head of water where the $SO_2$ is removed from the gas stream, typically in amounts greater than about 98%.

Optionally and preferably, the scrub water is subsequently softened by techniques known in the art such as treatment with basic softening agents, by Na-cation exchange, distillation, reverse osmosis and the like. Preferably the scrub water is treated in a water softening unit with lime, $Na_2CO_3$, sodium hydroxide or mixtures thereof. In this case a reduced amount of softening agent, i.e., lime, $Na_2CO_3$, sodium hydroxide or mixtures thereof, is required to soften the scrub water compared to produced water due to the precipitation of calcium sulfite or calcium sulfate. Thus this invention has the beneficial effect of reducing the amount of chemical addition required for softening and additionally reducing the amount of waste sludge produced. In any event, the scrub water is softened to provide a treated water stream having a pH in the range of about 8 to about 9. This water then may be fed to a steam generator used to generate steam for the bitumen recovery.

In another embodiment of the present invention two waste streams obtained in tar sands mining, extraction and upgrading processing are effectively managed and utilized.

In the extraction of bitumen from tar sands, the tar sands are treated with hot water and caustic. The bulk solids are removed from the water phase; however, fines remain suspended in the recovered water, necessitating holding the recovered water in settling ponds, often for years. This tailings pond water typically has a pH in the range of about 8 to about 9 and a high alkalinity on the order of 500 to 600 ppm or higher.

The extracted bitumen, of course, is upgraded using a coking or hydroconversion process in concert with hydrotreating to yield a synthetic crude oil as well as a process gas containing $H_2S$. This process gas is used as a source of fuel in the upgrader thereby resulting in the production of $SO_2$ in the flue gas. Although this flue gas may be scrubbed with the tailings pond water, the volume of flue gas requiring scrubbing preferably is first substantially reduced by selectively removing the $H_2S$ from the process gas to provide a concentrated $H_2S$ gas stream and thereafter incinerating the concentrated $H_2S$ stream in an incinerator as previously described to provide an $SO_2$ rich flue gas.

Surprisingly, it has been discovered that in scrubbing an $SO_2$ rich flue gas with tailings pond water, the $SO_2$ is substantially removed from the flue gas, the fines settle and the water becomes clear rapidly when the pH of the water is lowered to about 7 or below. Indeed the settling time decreases with decreasing pH, with a settling time of about 1 hour at a pH of 4.3.

Although the management of $SO_2$ rich flue gas and high alkalinity waste water streams has been described in detail by specific reference to those water streams obtained in tar sand extraction and oil sand recovery, it should be appreciated that the invention has applicability to other processes resulting in the production of such streams. Indeed both streams need not be the byproducts of a single industrial process. For example, $SO_2$-containing flue gas from a coal burning power utility could be used in treating tailing pond water. Similarly, high alkalinity water may be used to remove $SO_2$ from tail gas from sulfur plants prior to disposal or re-use, thereby increasing the overall sulfur recovery associated with the sulfur plant.

The following examples are provided to further illustrate the present invention.

EXAMPLES

Example 1

A synthetic flue gas containing 500 ppm $SO_2$ was sparged through a 200 cc sample of produced water from Cold Lake field of Northern Alberta. Flue gas was sparged through this water sample until the pH of the water was reduced from 7.5 to 5.8. At pH 5.8 a total of 55 liters of this synthetic flue gas had been sparged through the water. A sample of the scrubbed gas was collected at pH 5.8 and analyzed for $SO_2$ concentration by gas chromatography. The concentration of $SO_2$ measured was less than 1 ppm, thereby indicating >99.8 percent $SO_2$ removal.

Example 2

A synthetic flue gas containing 500 ppm $SO_2$ was sparged through 200 cc of opaque tailings pond water produced by the hot water and caustic extraction of mined bitumen at the Syncrude lease in Northern Alberta. After about 160 liters of gas was sparged through the water, the resultant water had a pH of 4.3. After standing for less than one hour the water became clear and the fines settled to the bottom. This is a vast improvement over the months and often years required for settling without $SO_2$ treatment

Example 3

The procedure of Example 2 was followed except that the run was stopped when the water reached a pH of 6.5. Again the water became clear and the fines settled in about 12 hours which, as in Example 2, is a vast improvement over the months and often years required for settling without $SO_2$ treatment.

What is claimed is:

1. In the in situ recovery of bitumen from bitumen-containing sands wherein steam is injected into a well to recover bitumen therefrom and an effluent gas stream containing less than about one mole % $H_2S$ is obtained as well as a high alkalinity water stream, the improvement comprising:

selectively separating the $H_2S$ from the produced gas to obtain a concentrated $H_2S$ containing gas stream;

combusting the concentrated $H_2S$ gas stream to obtain an $SO_2$ rich flue gas;

dispersing the $SO_2$ rich flue gas in the high alkalinity water stream whereby $SO_2$ is substantially removed from the flue gas and a water stream of reduced pH is obtained.

2. The improvement of claim 1 wherein the $H_2S$ gas is combusted in a dedicated incinerator.

3. The improvement of claim 1 wherein sufficient $SO_2$ flue gas is dispersed in the high alkalinity water stream to reduce the water pH to less than about 7.0.

4. The improvement of claim 3 wherein the flue gas treated water stream is softened and the softened water is converted to steam for bitumen recovery.

* * * * *